(12) United States Patent
Chen et al.

(10) Patent No.: US 10,818,321 B1
(45) Date of Patent: Oct. 27, 2020

(54) METHOD FOR DETECTING THE TILTING OF HARD DISK DRIVE BASED ON FIRST AND SECOND CONTROL UNITS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Ching-Jou Chen, New Taipei (TW); Cheng-Ta Hu, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/549,131

(22) Filed: Aug. 23, 2019

(30) Foreign Application Priority Data

Apr. 23, 2019 (CN) .......................... 2019 1 0330347

(51) Int. Cl.
| | | |
|---|---|---|
| *G11B 19/04* | (2006.01) | |
| *G11B 33/02* | (2006.01) | |
| *G11B 5/596* | (2006.01) | |
| *G11B 5/55* | (2006.01) | |
| G11B 19/00 | (2006.01) | |
| G11B 27/36 | (2006.01) | |

(52) U.S. Cl.
CPC .......... *G11B 33/027* (2013.01); *G11B 5/5582* (2013.01); *G11B 5/596* (2013.01); *G11B 19/04* (2013.01); *G11B 19/00* (2013.01); *G11B 19/047* (2013.01); *G11B 27/36* (2013.01)

(58) Field of Classification Search
None
See application file for complete search history.

(56) References Cited

U.S. PATENT DOCUMENTS

| | | | | |
|---|---|---|---|---|
| 7,369,345 | B1 * | 5/2008 | Li ......................... | G11B 5/5582 360/73.03 |
| 7,382,567 | B2 * | 6/2008 | Liao ..................... | G01P 15/0891 360/75 |
| 7,450,332 | B2 * | 11/2008 | Pasolini .............. | G01P 15/0891 360/69 |
| 7,733,595 | B2 * | 6/2010 | Lucas .................. | G11B 19/043 360/69 |

(Continued)

*Primary Examiner* — Tan X Dinh
(74) *Attorney, Agent, or Firm* — ScienBiziP, P.C.

(57) ABSTRACT

An electronic device includes a sensing unit, a first control unit, and a second control unit. The sensing unit detects a parameter of the electronic device when the electronic device is tilted and sends a detection signal if the detected parameter exceeds the critical parameter. The first control unit and the second control unit receive the detection signal from the sensing unit. If the first control unit receives the detection signal before the second control unit, the first control unit controls the mechanical hard disk to power off and controls a magnetic head on the mechanical hard disk to reset from a working position to an original position. If the second control unit receives the detection signal before the first control unit, the second control unit controls the magnetic head on the mechanical hard disk to reset from the working position to the original position.

10 Claims, 3 Drawing Sheets

(56) References Cited

U.S. PATENT DOCUMENTS

| | | | | |
|---|---|---|---|---|
| 7,865,253 | B2* | 1/2011 | Harrington | G11B 19/042 |
| | | | | 700/21 |
| 8,718,938 | B2* | 5/2014 | Wolf | A61B 5/021 |
| | | | | 701/530 |
| 2007/0291400 | A1* | 12/2007 | Chang | G11B 21/12 |
| | | | | 360/75 |
| 2009/0013755 | A1* | 1/2009 | Tsai | G01P 21/00 |
| | | | | 73/1.38 |
| 2015/0162036 | A1* | 6/2015 | Mendoza | G11B 5/5582 |
| | | | | 360/31 |

* cited by examiner

METHOD FOR DETECTING THE TILTING OF HARD DISK DRIVE BASED ON FIRST AND SECOND CONTROL UNITS

FIELD

The subject matter herein generally relates to mechanical hard disk protection methods, and more particularly to a mechanical hard disk protection method and an electronic device implementing the method for protecting a hard disk of the electronic device when the electronic device is tilted.

BACKGROUND

Generally, when an electronic device, such as a computer, is tilted, a sensing unit of the electronic device sends a signal to a motherboard, and the motherboard sends a signal to the hard disk through a driver interface to control a magnetic head of the hard disk to protect the hard disk from damage. However, the motherboard may not receive the signal in time to prevent damage to the hard disk.

BRIEF DESCRIPTION OF THE DRAWINGS

Implementations of the present disclosure will now be described, by way of embodiments, with reference to the attached figures.

DETAILED DESCRIPTION

Figure 1:
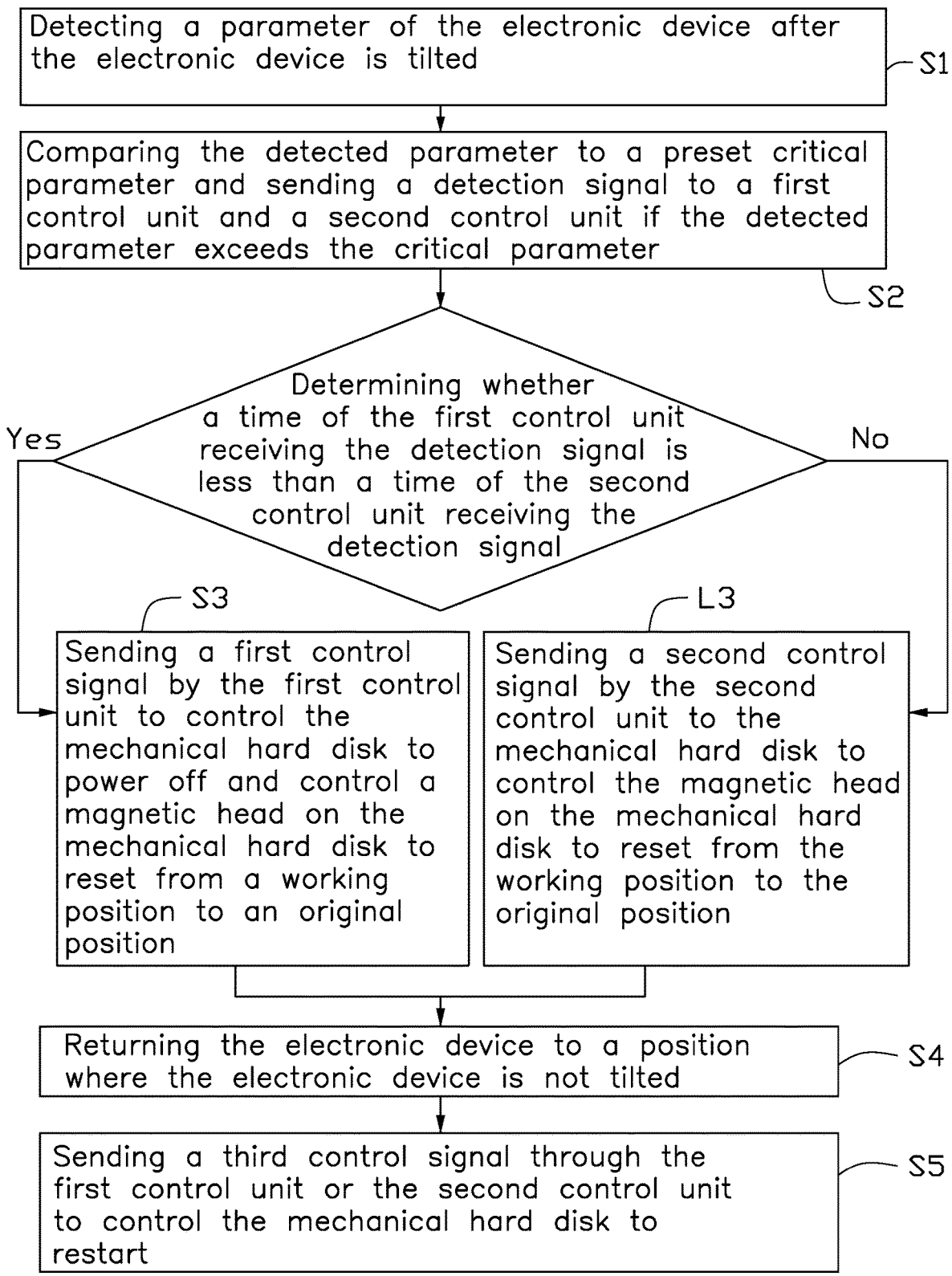
FIG. 1 is a flowchart of an embodiment of a mechanical hard disk protection method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of a mechanical hard disk protection method for protecting a hard disk of an electronic device. The method is provided by way of embodiment, as there are a variety of ways to carry out the method. Each block shown in FIG. 1 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S1, a parameter of the electronic device is detected after the electronic device is tilted.

At block S2, the detected parameter is compared to a preset critical parameter. If the detected parameter exceeds the critical parameter, the electronic device sends a detection signal to a first control unit and a second control unit.

A time of the first control unit receiving the detection signal is compared to a time of the second control unit receiving the detection signal. If the time of the first control unit receiving the detection signal is shorter than the time of the second control unit receiving the detection signal, block S3 is implemented. If the time of the second control unit receiving the detection signal is shorter than the time of the first control unit receiving the detection signal, block L3 is implemented.

At block S3, the first control unit sends a first control signal to control the mechanical hard disk to power off and control a magnetic head on the mechanical hard disk to reset from a working position to an original position.

At block L3, the second control unit sends a second control signal to the mechanical hard disk to control the magnetic head on the mechanical hard disk to reset from the working position to the original position.

Specifically, the electronic device includes a sensing unit. In one embodiment, the sensing unit is an accelerometer. The sensing unit senses whether the electronic device is tilted. A basic input/output system of the electronic device sets the critical parameter for the sensing unit through a control bus, and the critical parameter for the sensing unit corresponds to the parameter of the electronic device. The parameter of the electronic device may be an inclination angle, an angular displacement, or an angular velocity in X, Y, and Z directions, but is not limited thereto. The sensing unit senses the parameter of the electronic device. The critical parameter in the X, Y, and Z directions may be separately set. One or more of the critical parameter in the X, Y, and Z directions may be set to different values. The critical parameter may be set by impacting the electronic device, such as by shaking a desktop on which the electronic device is placed, to determine the critical parameter.

In one embodiment, the first control unit is a hardware control unit, and the second control unit is a chip control. When the detected parameter is less than the critical parameter, the magnetic head on the mechanical hard disk is not reset.

When the time of the first control unit receiving the detection signal is less than the time of the second control unit receiving the detection signal, the mechanical hard disk is powered off by a hardware circuit, and then the magnetic head on the mechanical hard disk is reset from a position in contact with a disk surface to the original position to protect the magnetic head from being damaged. When the time of the first control unit receiving the detection signal is less than the time of the second control unit receiving the detection signal, the second control unit sends the second control signal to the mechanical hard disk to control the magnetic head to be reset from the working position to the original position. Specifically, the second control unit is a chip control, and the mechanical hard disk is controlled by a south bridge chip. The time of the first control unit and the second control unit receiving the detection signal may be detected by another sensing unit, which is not described herein.

At block S4, the electronic device is returned to a position where the electronic device is not tilted.

At block S5, after the electronic device is returned to a position where the electronic device is not tilted, the electronic device sends a third control signal through the first control unit or the second control unit to control the mechanical hard disk to restart. Thus, the mechanical hard disk protection method can protect the magnetic head of the mechanical hard disk from damage.

Figure 2:
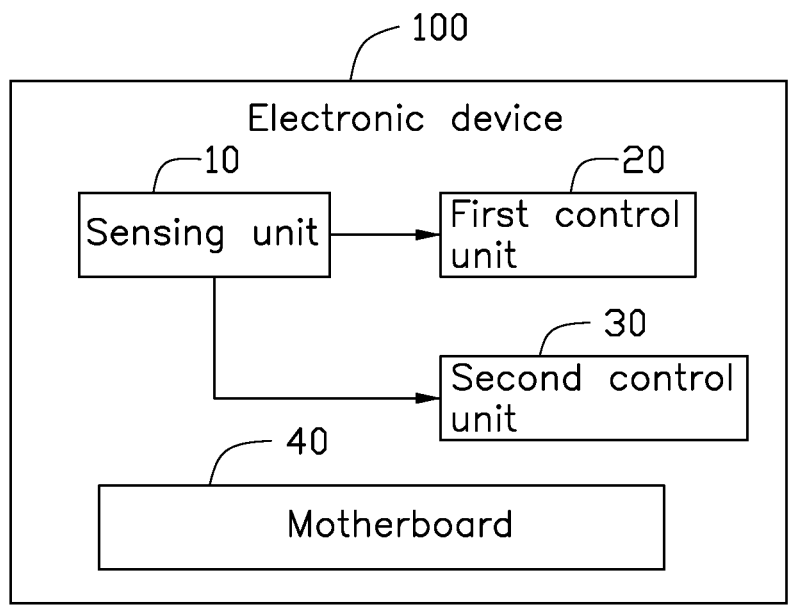
FIG. 2 is a block diagram of an electronic device implementing the method of FIG. 1.

FIG. 2 shows an embodiment of an electronic device 100 adopting the above-described mechanical hard disk protection method. The electronic device 100 includes a sensing unit 10, a first control unit 20, a third control unit 30, and a motherboard 40. The sensing unit 10 is an accelerometer, the first control unit 20 is a hardware control unit, and the second control unit 30 is a chip control. The sensing unit 10, the first control unit 20, and the second control unit 30 are located on the motherboard 40 and electrically coupled to the motherboard 40. The sensing unit 10, the first control unit 20, and the second control unit 30 respectively correspond to the sensing unit, the first control unit, and the second control unit described in the mechanical hard disk protection method.

The sensing unit 10 detects the parameter of the electronic device 100 by sensing a change in the X, Y, and Z directions of the electronic device 100. The critical parameter is preset in the sensing unit 10, so that the detected parameter of the electronic device is compared to the critical parameter. If the detected parameter of the electronic device 100 exceeds the critical parameter, the sensing unit 10 sends the detection signal to the first control unit 20 and the second control unit 30. Whether the time of the first control unit 20 receiving the detection signal is less than the time of the second control unit 30 receiving the detection signal is determined. If the time of the first control unit 20 receiving the detection signal is less than the time of the second control unit 30 receiving the detection signal, the first control unit 20 sends the first control signal to control the mechanical hard disk to power off and control the magnetic head on the mechanical hard disk to reset from the working position to the original position. After the electronic device 100 is returned to a position where the electronic device 100 is not tilted, the first control unit 20 sends the third control signal to control the mechanical hard disk to return to the working position. If the time of the first control unit 20 receiving the detection signal is longer than the time of the second control unit 30 receiving the detection signal, the mechanical hard disk is controlled by the second control unit 30.

Figure 3:
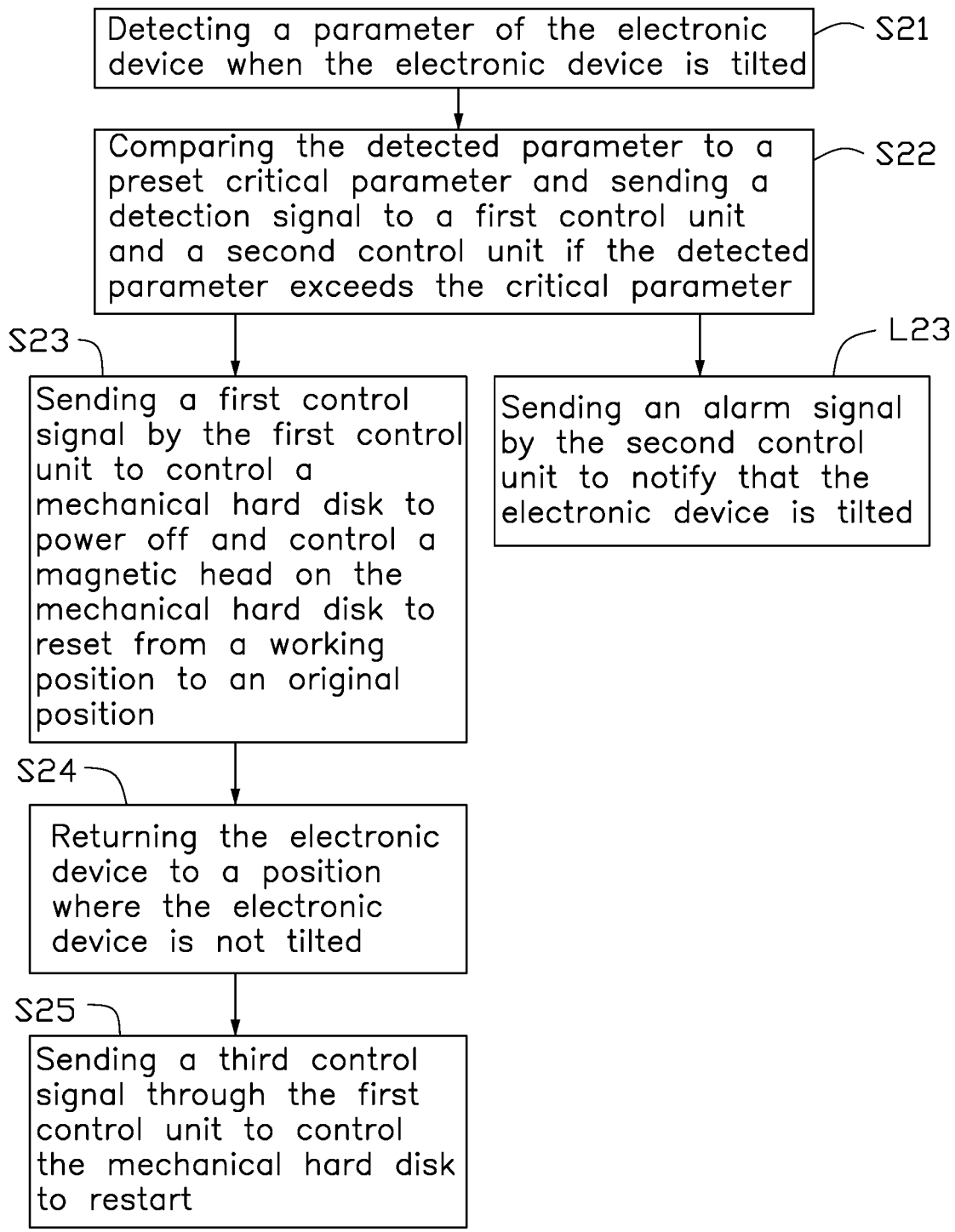
FIG. 3 is a flowchart of another embodiment of a mechanical hard disk protection method.

FIG. 3 shows a flowchart of a second embodiment of a mechanical hard disk protection method for protecting a hard disk of an electronic device. The method is provided by way of embodiment, as there are a variety of ways to carry out the method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S21, the parameter of the electronic device is detected when the electronic device is tilted.

At block S22, if the detected parameter exceeds the critical parameter, the detection signal is sent to the first control unit and the second control unit.

At block S23, after the first control unit receives the detection signal, the first control unit sends a first control signal to control the mechanical hard disk to power off and control a magnetic head on the mechanical hard disk to reset from a working position to an original position.

At block L23, after the second control unit receives the detection signal, the second control unit sends an alarm signal to notify that the electronic device is tilted.

At block S24, the electronic device is returned to a position where the electronic device is not tilted.

At block S25, after the electronic device is returned to a position where the electronic device is not tilted, the electronic device sends a third control signal through the first control unit to control the mechanical hard disk to restart. Thus, the mechanical hard disk protection method can protect the magnetic head of the mechanical hard disk from damage.

In summary, if the electronic device 100 is tilted and the detected parameter exceeds the critical parameter, the sensing unit 10 sends the detection signal to both the first control unit 20 and the second control unit 30, so that a faster one of the first control unit 20 or the second control unit 30 receiving the detection signal can reset the magnetic head of the hard disk by different control means, so that the magnetic head can be reset in time to prevent damage to the hard disk.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A mechanical hard disk protection method for protecting a hard disk of an electronic device, the method comprising:
   detecting a parameter of the electronic device after the electronic device is tilted;
   comparing the detected parameter to a preset critical parameter, and sending a detection signal to a first control unit and a second control unit if the detected parameter exceeds the critical parameter;
   comparing a time of the first control unit receiving the detection signal to a time of the second control unit receiving the detection signal;
   sending a first control signal, by the first control unit, to control the mechanical hard disk to power off and control a magnetic head on the mechanical hard disk to reset from a working position to an original position, if the time of the first control unit receiving the detection signal is shorter than the time of the second control unit receiving the detection signal; and
   sending a second control signal, by the second control unit, to the mechanical hard disk to control the magnetic head on the mechanical hard disk to reset from the working position to the original position, if the time of the second control unit receiving the detection signal is shorter than the time of the first control unit receiving the detection signal.

2. The mechanical hard disk protection method of claim 1, wherein:
   the parameter of the electronic device comprises at least one of an inclination angle, an angular displacement, or an angular velocity in X, Y, and Z directions.

3. The mechanical hard disk protection method of claim 1, further comprising:
sending a third control signal, by the first control unit or the second control unit after the electronic device is returned to a position where the electronic device is not tilted, to control the mechanical hard disk to restart.

4. The mechanical hard disk protection method of claim 1, wherein:
whether the electronic device is tilted is detected by a sensing unit of the electronic device; and
the sensing unit sends the detection signal.

5. The mechanical hard disk protection method of claim 4, wherein:
the sensing unit is an accelerometer;
the first control unit is a hardware control unit; and
the second control unit is a chip control.

6. An electronic device comprising:
a motherboard;
a sensing unit located on the motherboard and configured to detect whether the electronic device is tilted, detect a parameter of the electronic device when the electronic device is tilted, compare the detected parameter to a preset critical parameter, and send a detection signal if the detected parameter exceeds the critical parameter;
a first control unit located on the motherboard and configured to receive the detection signal from the sensing unit; and
a second control unit located on the motherboard and configured to receive the detection signal from the sensing unit; wherein:
the first control unit sends a first control signal to control the mechanical hard disk to power off and control a magnetic head on the mechanical hard disk to reset from a working position to an original position, if a time of the first control unit receiving the detection signal is shorter than a time of the second control unit receiving the detection signal; and
the second control unit sends a second control signal to the mechanical hard disk to control the magnetic head on the mechanical hard disk to reset from the working position to the original position, if the time of the second control unit receiving the detection signal is shorter than the time of the first control unit receiving the detection signal.

7. The electronic device of claim 6, wherein:
the first control unit is a hardware control unit;
the second control unit is a chip control;
the first control unit powers off the mechanical hard disk by a hardware circuit; and
the second control unit controls the mechanical hard disk by a south bridge chip.

8. The electronic device of claim 6, wherein:
the parameter of the electronic device comprises at least one of an inclination angle, an angular displacement, or an angular velocity in X, Y, and Z directions.

9. The electronic device of claim 6, wherein:
the first control unit or the second control unit sends a third control signal, after the electronic device is returned to a position where the electronic device is not tilted, to control the mechanical hard disk to restart.

10. The electronic device of claim 6, wherein:
the sensing unit is an accelerometer.

* * * * *